United States Patent
Yamamoto

(10) Patent No.: US 7,562,201 B2
(45) Date of Patent: *Jul. 14, 2009

(54) RECORDING DEVICE AND RECORDING AND REPRODUCING DEVICE

(75) Inventor: Takayuki Yamamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/657,560

(22) Filed: Jan. 25, 2007

(65) Prior Publication Data

US 2007/0186038 A1    Aug. 9, 2007

Related U.S. Application Data

(63) Continuation of application No. 10/844,589, filed on May 13, 2004, now Pat. No. 7,185,160.

(30) Foreign Application Priority Data

Mar. 17, 2004   (JP)  .............. 2004-075553

(51) Int. Cl.
  G06F 12/00   (2006.01)
  G06F 17/30   (2006.01)
(52) U.S. Cl. .................... 711/163; 726/26; 711/164
(58) Field of Classification Search ................. 711/112, 711/163, 164; 713/178
  See application file for complete search history.

(56) References Cited

U.S. PATENT DOCUMENTS

| 6,920,482 | B1 | 7/2005 | Fujiyoshi |
| 7,039,811 | B2 | 5/2006 | Ito |
| 7,146,559 | B2 | 12/2006 | Sakuma |
| 2002/0083284 | A1 | 6/2002 | Matsubara et al. |
| 2002/0123336 | A1* | 9/2002 | Kamada .................... 455/420 |
| 2002/0126843 | A1 | 9/2002 | Murase et al. |
| 2002/0184159 | A1* | 12/2002 | Tadayon et al. ............... 705/54 |

(Continued)

FOREIGN PATENT DOCUMENTS

JP    2000-315179    11/2000

(Continued)

OTHER PUBLICATIONS

Korean Office Action issued in corresponding Korean Patent Application No. KR 10-2004-0034133, dated Sep. 30, 2006.

*Primary Examiner*—Kevin L Ellis
*Assistant Examiner*—Baboucarr Faal
(74) *Attorney, Agent, or Firm*—McDermott Will & Emery LLP

(57) ABSTRACT

To make content irreproducible in a recording device after a set expiration time, the recording device has a read/write unit for reading and writing data on a recording unit, the read/write unit having electric power supplied from an external power source, a clock containing a built-in battery, an input/output interface for inputting data from outside and outputting data to outside, and a controller for controlling the read/write unit and the input/output interface. The recording medium includes an ordinary data area for writing ordinary data and an expiration time data area for writing an expiration time of ordinary data. The controller prevents ordinary data written in the ordinary data area from being output to outside when the expiration time written in the expiration time area has passed a time limit calculated by the clock.

4 Claims, 6 Drawing Sheets

U.S. PATENT DOCUMENTS

| | | |
|---|---|---|
| 2003/0145182 A1 | 7/2003 | Naito et al. |
| 2003/0163719 A1 | 8/2003 | Ebihara |
| 2003/0165238 A1 | 9/2003 | Naccache et al. |
| 2003/0196036 A1* | 10/2003 | Gibble et al. ............... 711/111 |
| 2003/0231869 A1 | 12/2003 | Kitani |
| 2004/0010655 A1 | 1/2004 | Tanaka et al. |
| 2004/0015713 A1 | 1/2004 | Abe et al. |

FOREIGN PATENT DOCUMENTS

| | | |
|---|---|---|
| JP | P2003-22339 A | 1/2003 |
| JP | 2003-167788 | 6/2003 |
| JP | 2003-248629 | 9/2003 |
| JP | 2003-317378 | 11/2003 |

* cited by examiner

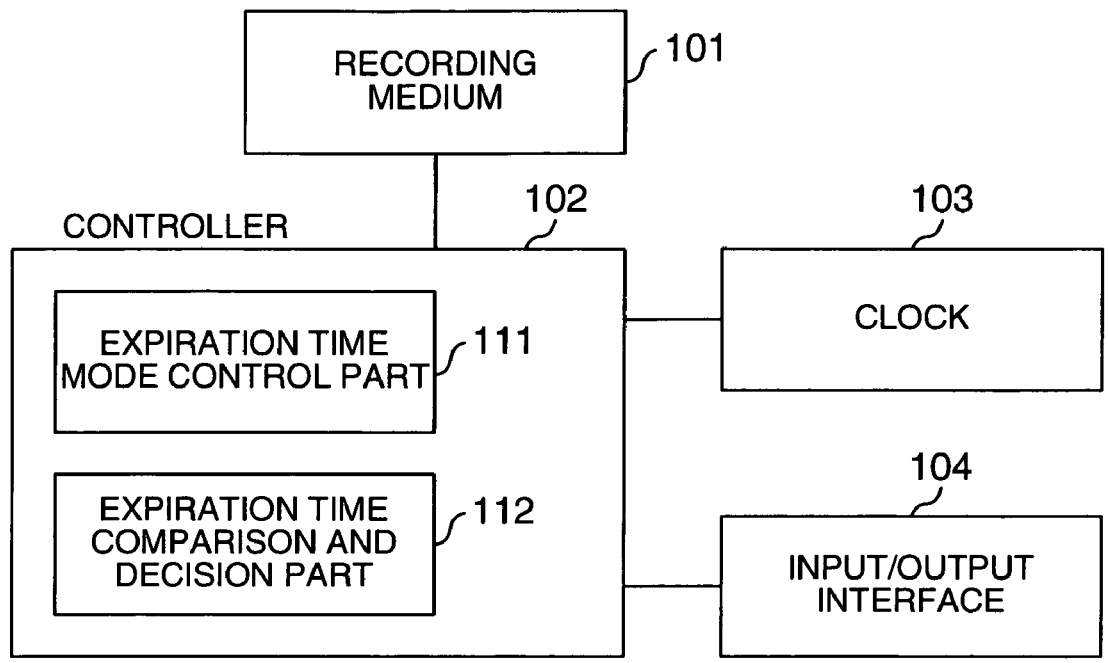
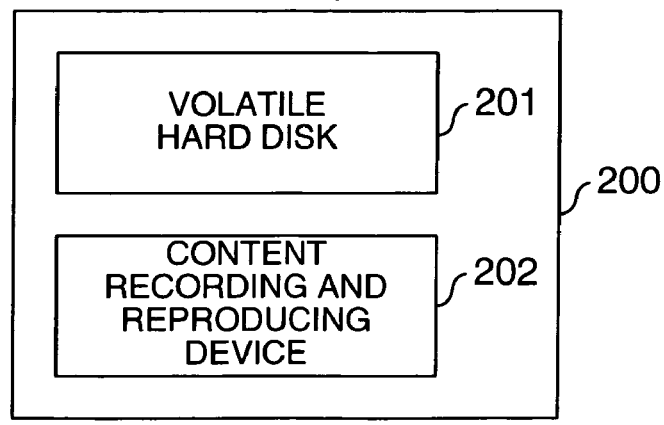

RECORDING DEVICE AND RECORDING AND REPRODUCING DEVICE

The present application is a continuation of application Ser. No. 10/844,589, filed on May 13, 2004, now U.S. Pat. No. 7,185,160 issued Feb. 27, 2007, which claims priority from Japanese Application No. JP 2004-075553 filed on Mar. 17, 2004, the disclosures of which are hereby incorporated by reference herein.

BACKGROUND OF THE INVENTION

1. Field of the Invention

The present invention relates to control of reproduction of data with an expiration time on a recording and reproducing device.

2. Description of the Related Art

In JP-A-2003-22339, an invention is disclosed, which discloses a method of content management to preclude illegal use of data by changing time (paragraph 0009 of JP-A-2003-22339), and in this method, as information for limiting the use of content, there are provided information about a utilization date for specifying at least either an availability-start date and time or an availability-end date and time, and information about reference date and time, and it is arranged that the information about a reference date and time is updated (paragraph 0011).

SUMMARY OF THE INVENTION

However, in the recording medium set out in the above-mentioned patent document, information about utilization date is recorded but a clock function is not provided. Therefore, as in small-size portable memories which are rapidly spreading in recent years, if they are carried around, a problem arises that contents stored in the recording medium can be reproduced on another reproducing device by changing a setting of the clock of this other reproducing device.

The object of the present invention is to provide a recording device and a recording and reproducing device to solve the above problem.

The present invention is characterized in that control is implemented such that when an expiration time written in an expiration time data area on a recording medium has passed a time limit calculated by the clock function of a built-in clock (hereinafter referred to as battery-built-in clock), ordinary data written in an ordinary data area is prevented from being output.

With the arrangement, even if a setting of the clock of an external reproducing device is changed, when the time limit calculated by the clock function of the battery-built-in clock has passed, ordinary data is prevented from being output to the outside, thus making it possible to prevent reproduction of data after the expiration time on the reproducing device, which is effective in protecting copyright.

According to the present invention, it is possible to provide a recording device and a recording and reproducing device capable of effectively protecting copyright.

Other objects, features and advantages of the invention will become apparent from the following description of the embodiments of the invention taken in conjunction with the accompanying drawings.

BRIEF DESCRIPTION OF THE DRAWINGS

FIG. 1 is an explanatory diagram of an embodiment;

FIG. 2 is an explanatory diagram showing the structure of the whole of a content recording and reproducing device;

DESCRIPTION OF THE EMBODIMENTS

Figure 3:
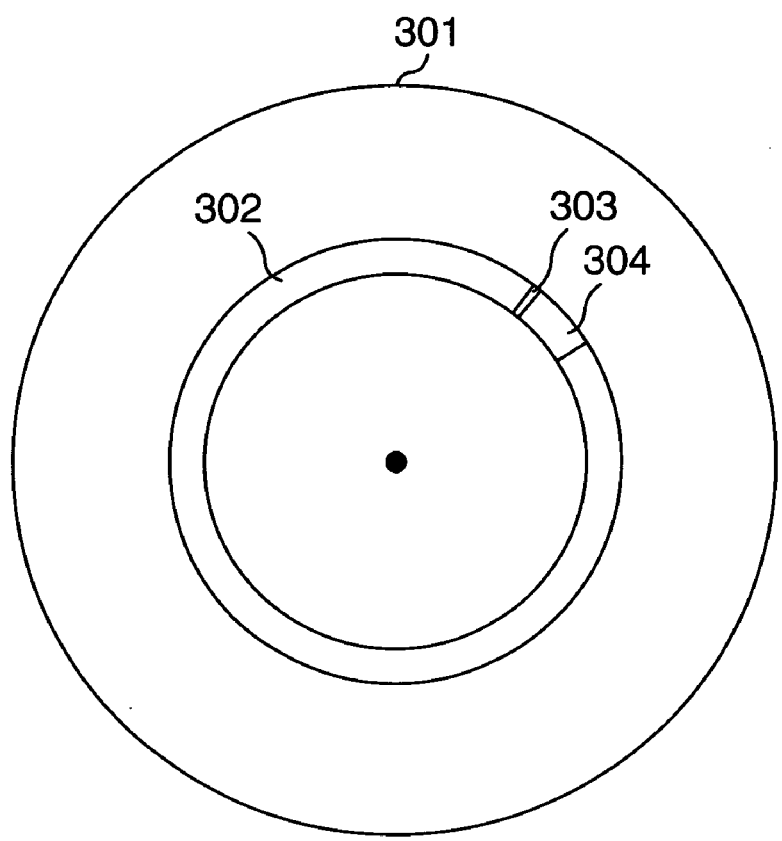
FIG. 3 is an explanatory diagram showing the data structure on a magnetic disk of a volatile hard disk.

An embodiment will be described with reference to the accompanying drawings. FIG. 1 is a block diagram of the devices in the present invention. Reference numeral 101 denotes a recording medium of a hard disk, in which data is recorded. Numeral 102 denotes a controller of the hard disk, which controls motors and so on attached to the recording medium. Numeral 103 denotes a clock on which the counter value increments in seconds or in similar units. The clock 103 may be a clock that shows date and time. This clock has a built-in battery, and therefore the counter or date and time is updated even when electric power is not supplied to the hard disk. Numeral 104 denotes an input/output interface which is used for external connections. Numeral 111 denotes an expiration time mode control part, which manages whether reading or writing is in the expiration time mode or not. In the expiration time mode, when reading is performed, comparison and confirmation of the expiration time is carried out by using an expiration time comparison and confirmation part 112, and when writing is performed, data on an expiration time is written in the extended data area 303. Numeral 112 denotes the expiration time comparison and confirmation part, and when reading is performed in the expiration time mode, the expiration time written in the extended data area 303 is compared with the counter value or data on date and time on the clock 103, and if the expiration time has passed or expired, instead of ordinary data 304 which has been read, invalid data or the like is output as data in that sector from the input/output interface 104.

Referring to FIG. 2, description will be made of an ordinary mode of use of the hard disk. An example of 200 may be a hard disk recorder for recording television pictures with sound, a car navigation system proper, a portable small-size music recording and reproducing player, or a personal computer. The device 200 can use a hard disk as an internal or external attachment, and one function of it is to record and reproduce contents. For example, a hard disk recorder can record TV programs and reproduce recorded TV programs. Here, a volatile hard disk connected to the device 200 is designated by 201 and the remainder other than the volatile hard disk is a content recording and reproducing device designated by 202.

Referring to FIG. 3, description will now be made of expansion of the sectors of the hard disk as one feature of the present invention. Numeral 301 denotes a magnetic disk as a part of the recording medium of the hard disk. Numeral 302 denotes a track, one of recording units on a magnetic disk. A track 302 includes a plurality of sectors. Each sector contains an extended area 303 and an ordinary data area 304. In the extended data area, only the controller 102 of the hard disk can write. On the other hand, in the ordinary data area, a device such as the content recording and reproducing device 202 specifies a sector and reads and write data in the sector through the input/output interface 104. In an ordinary method of using the ordinary data area, the ordinary data area is used through a file system. In ordinary, known hard disks, a sector includes only an ordinary data area 304. In the present invention, a sector further includes an extended data area 303 where an expiration time is recorded. Thus, in a device which uses a disk as a recording medium, by recording expiration time data and ordinary data in the sectors, reading can be carried out more quickly than in a case where expiration time data is recorded in the center or in the outer periphery of the disk, for example. The reason is as follows: in the present invention, the read head need not be moved relative to the disk when reading data recorded on the disk, resulting in faster read/write processing. Moreover, when expiration times are recorded in one place or at one location, that is, in the center of or in the outer periphery of the disk and expiration times of the sectors are managed by addresses, the sectors amount to a large number on a large-volume-recording medium, such as a disk, it takes a long time to process data for management purposes; therefore, the method of this example is preferable in terms of processing speed.

In a structure using an extend data area and an ordinary data area, when an ordinary data area is 512 bytes, for example, and a sector is formed only by the ordinary data area, one sector is 512 bytes. On the other hand, in a case where an extended data area is 4 bytes and an ordinary data area is 512 bytes, one sector is 516 bytes. For example, in the case of a track A where 100 sectors, each formed only by an ordinary data area, can be generated on one track, if sectors are generated each added with an extended data area, then the number of sectors that can be generated on this track is 512×100÷516=99.2, which means that the number of sectors that can be generated becomes smaller.

Figure 4:
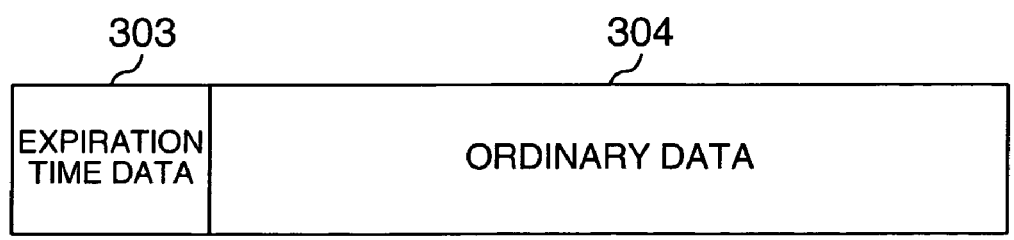
FIG. 4 is an explanatory diagram showing an extended data area and an ordinary data area.

Next, referring to FIG. 4, description will be made of an extended area 303 and an ordinary area 304. In the extended area 303, expiration time data is recorded. As for data on an expiration time, let us consider the case where the counter of the clock 103 shows 10000 in minute units, for example. Supposing that the expiration time one wishes to set is 24 hours, the expiration time is 10000+24×60=11440. Alternatively, the expiration time may be specified by date and time. On the other hand, in an ordinary data area 304, contents are recorded as ordinary data.

Figure 5:
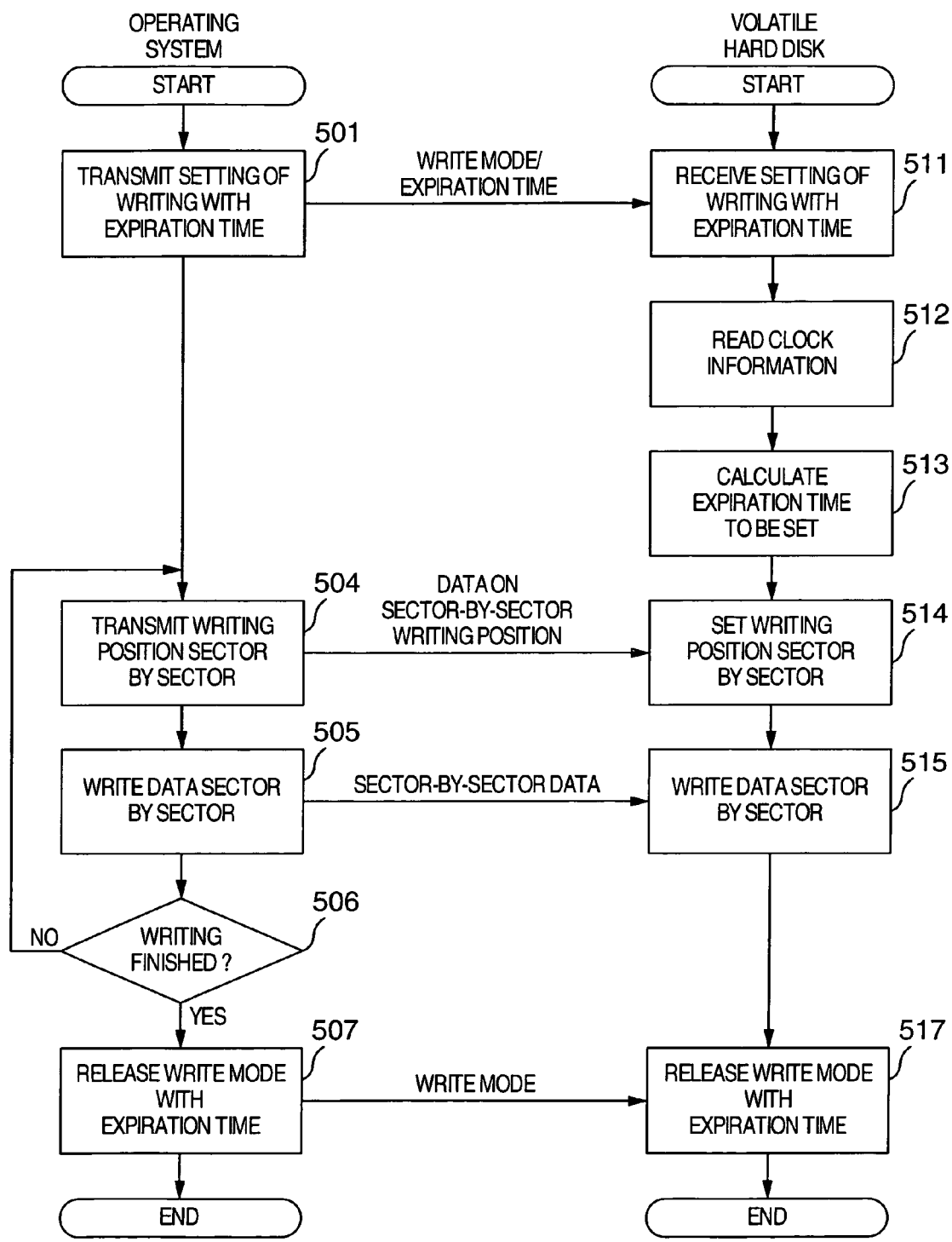
FIG. 5 is a flowchart when writing with an expiration time is performed.

Next, referring to FIG. 5, description will be made of the flow of writing with an expiration time by the volatile hard disk 201 and the content recording and reproducing device 202. Note that generally the operation of the content recording and reproducing device 202 can be replaced by the operation of the operating system of the content recording and reproducing device 202. This flowchart shows the process when a file is written in sector units by the operating system by using its file system. In the following, description will be made by supposing the recording and reproducing device 202 as an operating system; however, if an operating system is not used, it may be replaced by a similar means. The same can be said of the file system.

The operating system sets, for subsequent writing, an expiration time mode and an expiration time in the volatile hard disk (501). The volatile hard disk sets the expiration time mode in the expiration time mode control part 111, and the expiration time is held in the memory of the controller 102 or in the expiration time mode control part 111 (511). By this operation 511, data subsequently received from the input/output interface is all written in the expiration time mode from this moment onward. Subsequently, the expiration time mode control part 111 reads the current counter value or current time from the clock 103 (512). Then, the expiration time control part 111 calculates an expiration time (513) which is to be used hereafter on the basis of clock information read at Step 512 (513). In the calculation of the expiration time, if a counter value is used, clock information read at Step 512 is used as the counter value, and an expiration time specified by a number of hours is added to the counter value, and a resultant sum total is the expiration time to be used hereafter. If an expiration time is set by date and time, the expiration time transmitted at Step 501 is used as it is. Then, the operating system transmits a writing position for each sector (504). The volatile hard disk receives a writing position and temporarily holds it (514) to be used in Step 515. Then, the operating system transmits data sector by sector (505). The volatile hard disk writes received data (515) in the writing position received at Step 514. Note that data of Steps 504 and 505 may be transmitted at the same time. Similarly, at Steps 514 and 515, data may be received and both processes may be executed at the same time. Subsequently, the operating system decides if writing has been finished (506). In other words, the above-mentioned "writing has been finished" means that, for example, when writing a file, the file was divided into data blocks for a plurality of sectors and the processes at Steps 504 and 505 were executed, by which data was written in all related sectors. If writing has not been finished, this routine goes back to Step 504, and the related processes are repeated. When writing has been finished, the operating system sends a request to the volatile hard disk asking it to release the write mode with an expiration time (507). On receiving the request to release the write mode with an expiration time, the volatile hard disk deletes the expiration time from the expiration time mode control part 111, and turns off the write mode with an expiration time (517). From the process 517 onward, even if data arrives at the process 514, the data is written as data without an expiration time.

Figure 6:
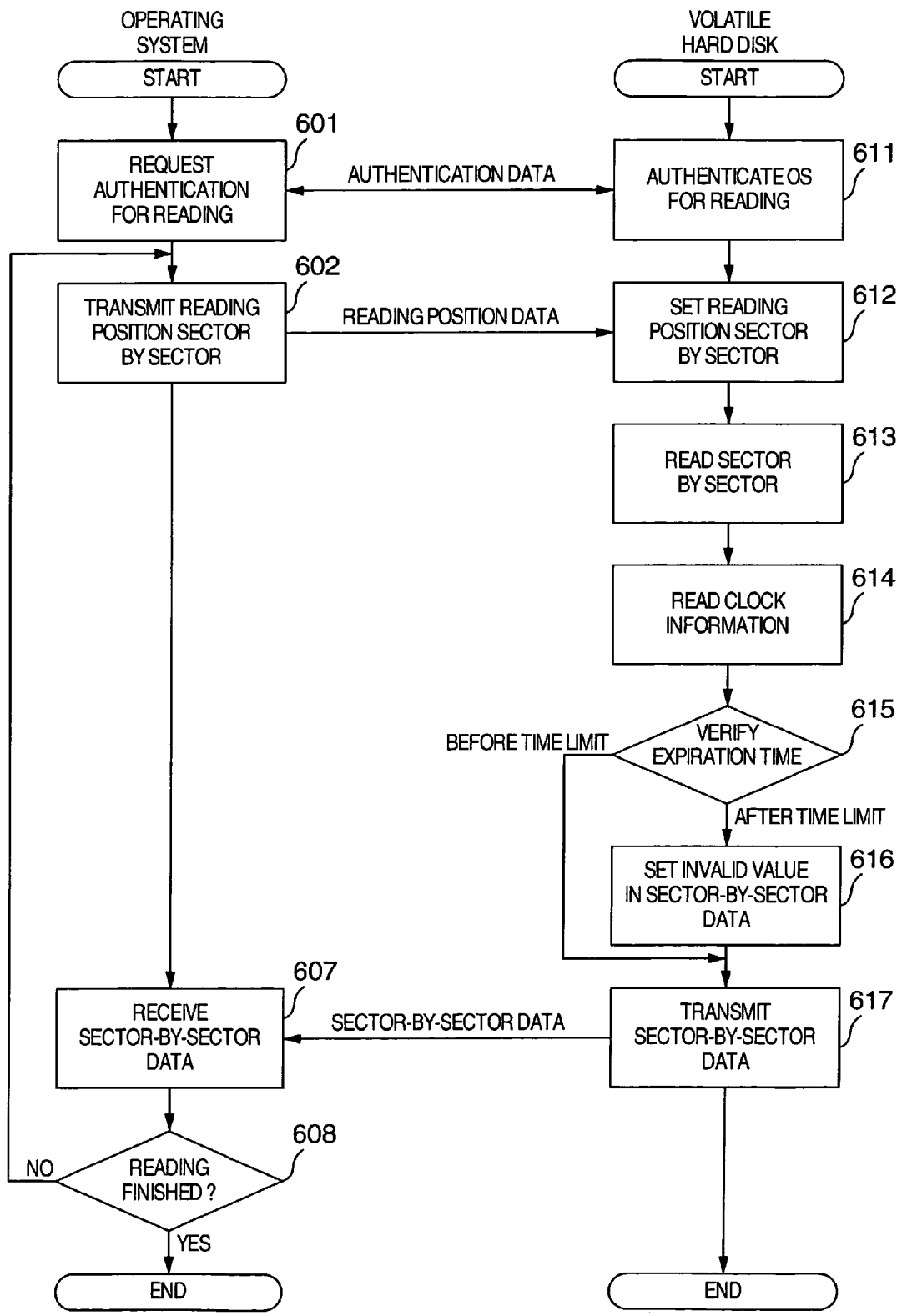
FIG. 6 is a flowchart when reading with an expiration time is performed.

Referring to FIG. 6, description will next be made of the flow of reading by the volatile hard disk 201 and the content recording and reproducing device 202. As has been described with reference to FIG. 5, generally, the operation of the content recording and reproducing device 202 is the operation of the operating system of the content recording and reproducing device 202. This flowchart shows the process when a file is read in sector units by the operating system by using its file system. In the following, description will be made by supposing the recording and reproducing device 202 as an operating system; however, if an operating system is not used, it may be replaced by a similar means. The same can be said of the file system.

When processing is started, the operating system issues a request to authenticate its own identity to the volatile hard disk 201 (601), and in response to the request, the volatile hard disk 201 authenticates the operating system 202 (611). The authentication at Steps 601 and 602 is a process for the volatile hard disk 201 to verify whether or not the operating system is a legitimate system. The legitimate system is a system which has been authenticated by a Certificate Authority and certified not to produce illegal copies. This authentication process includes all methods for authentication of the same sort. For example, the operating system 202 issues an authentication request to the volatile hard disk 201. The volatile hard disk 201 generates a random number, encrypts the random number by a public key of public key encryption system, and transmits an encrypted text to the operating system 202. If the operating system 202 is legitimate, the operating system 202 internally holds a private key. Therefore, if the system 202 is legitimate, the operating system 202 decrypts an encrypted text with the private key and transmits a plain text to the volatile hard disk 201. The volatile hard disk 201 verifieds the random number of the plain text received, and confirms that the operating system 202 is a legitimate system. If it is not confirmed that the operating system 202 is a legitimate system, the volatile hard disk 201 operates in a manner of regarding incoming data as having passed the expiration time in any circumstances.

When reading starts, the operating system transmits a reading position for each sector (602). When receiving a reading position, the volatile hard disk temporarily holds it for use in Step 613 (612). Then, the volatile hard disk reads the sector set in Step 612 (613). After this, the expiration time comparison and decision part 112 reads current clock information from the clock 103 (614). Note that Step 614 has only to be executed once for Step 601 to Step 617 in this flowchart and need not be executed a second time and more. Subsequently, the expiration time comparison and decision part 112 compares the expiration time 303 read out in Step 613 with clock information read in Step 614 (615). If the comparison shows that the clock information read in Step 614 is larger than the expiration time 303, in other words, the expiration time has passed or expired, the routine proceeds to a process 616. If the expiration time has not passed or expired, the routine proceeds to a process 617. In a process 616, ordinary-area data 304 in a sector read out in Step 613 is overwritten by invalid data. Invalid data is data consisting of only 0's or 1's, for example, which is meaningless when it is read. The invalid data is data held in the expiration time comparison and decision part 112 or data set through the input/output interface 104. In a process 617, data 304 in sector units are transmitted to the operating system, and received by the operating system (607). Normally, data, when received, is in the form of a plurality of data, and reassembled into the original data form by the file system or the like. Then, the operating system decides if reading has been finished (608). If reading has not been finished, the process 602 is repeated. When reading has been finished, the processing is completed.

Figure 7:
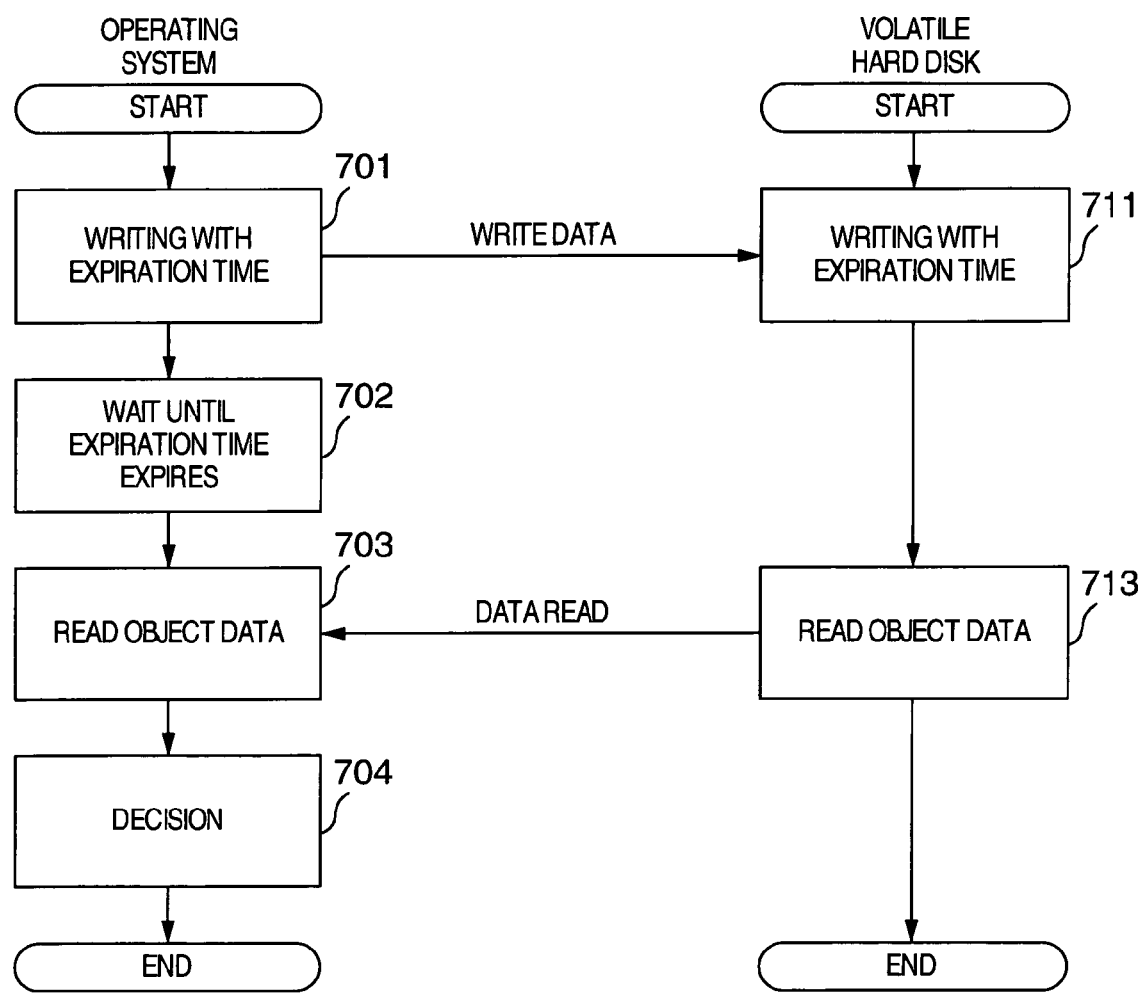
FIG. 7 is a flowchart when verifying the validity of a volatile hard disk.

Referring to FIG. 7, description will be made of the flow of the operating system 202's verification of the validity of the volatile hard disk 201. The verification of the validity is to confirm that the volatile hard disk actually makes it impossible to reproduce the content after the expiration time. When processing is started, the operating system 202 causes data with an expiration time to be written (701). The volatile hard disk 201 writes data specified by the operating system (711). The process 701 corresponds to and is similar to the processes 501 to 507, and the process 711 corresponds to and is similar to the processes 511 to 517. The operating system waits until an expiration time set in Step 701 expires (702). When the expiration time expires, the operating system reads object data (703). The volatile hard disk 201 reads the data specified by the operating system 202 (713). The process 703 corresponds to and is similar to the processes 602 to 608, and the process 713 corresponds to and is similar to the processes 612 to 617. The operating system 202 compares the read data with the written data, and if these data are the same, decides that the volatile hard disk 201 does not have validity (704), or if these data are different, decides that the volatile hard disk 201 has validity (704).

Figure 8:
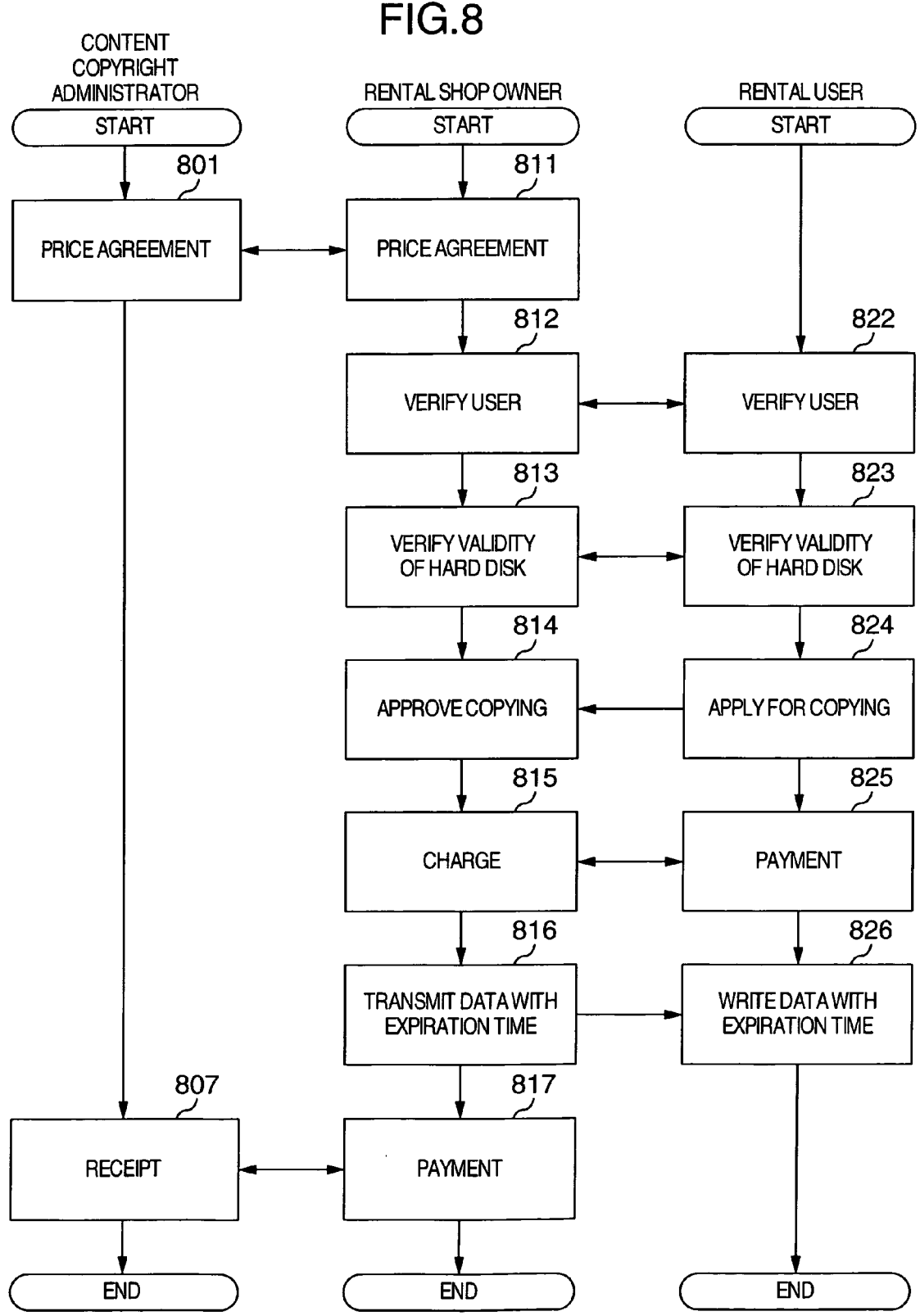
FIG. 8 is a flowchart when rental business is conducted by using a volatile hard disk.

Referring to FIG. 8, description will be made of the flow of rental business through a volatile hard disk between a content copyright administrator, a rental shop owner, and a rental user. Rental is to give a temporary right to reproduce content, wherein hiring out is to give the reproducing right, and renting is to be granted the reproducing right. The content copyright administrator is a person who owns copyrights of contents or a person of a category similar to the above-mentioned copyright owner, and he has the right to collect a commission from rental shop owners who hire out content for a rental fee. The rental shop owner is a person who hires out content to users. The rental shop owner is required to pay a charge to the person who owns copyrights of contents when he rents content out. The rental user is a person who concludes a rental contract with the rental shop owner and pays a rental fee when he rents content. In this flowchart, the rental user is granted a temporary reproducing right of content which he copies to his volatile hard disk 201.

The processes 801 and 811 are related to price agreement between the content administrator and the rental shop owner. The price agreement is agreement under which the rental shop owner pays the content copyright administrator ¥200 when the rental shop owner rents out a movie A for a week, for example. Next, in processes 812 and 822, the rental shop owner verifies a rental user by a membership card, for example. After this, in processes 813 and 823, the legitimacy of the hard disk is confirmed. The confirmation of the legitimacy consists of authentication of the processes 601 and 611 and verification of the validity of the processes 701 to 713. Then, the rental user applies to the rental shop owner for copying (824). The application for copying is to specify content, such as the title of a movie and an expiration time. After this, the rental shop owner approves of copying provided the application for copying is legitimate (814). Whether the application for copying is legitimate or not is determined by an age limit, a maximum expiration time set on the content, and so on. Then, the rental shop owner charges a rental fee to the rental user (815), and the rental user pays the rental fee according to an account (825). Further, the rental shop owner transmits data with an expiration time to the rental user's volatile hard disk 201 (816), and the volatile hard disk 201 writes data (826). The process 816 corresponds to and is similar to the processes 501 to 507. The process 826 corresponds to and is similar to the processes 511 to 517. Subsequently, the rental shop owner pays the content copyright administrator a sum of money based on the price agreement and a renting record (817) and the content copyright administrator receives the payment (807).

If a server is arranged to execute the processes, which have been carried out by the rental shop owner in FIG. 8, the processes are implemented based on technical ideas that follow laws of nature, and by using this server, it becomes possible for the rental shop owner to conduct business well suited to protection of copyrights.

In the foregoing embodiment, as an example of the recording device, a hard disk drive has been used, but this is not intended to show a limitation of embodiment of the recording device, and any recording device that has a recording medium capable of recording data may be used. It goes without saying, however, that the recording medium needs to include a battery-built-in clock, memory area where data on an expiration time is written, and a controller.

With this arrangement, it is possible to prevent the content from being reproduced after expiry of the time by using the hard disk. Even after expiry of the expiration time of the content, it is possible for the file system to see the content as a file of invalid data and delete the content at arbitrary timing as intended by the file system. Moreover, though driving power is being supplied to the hard disk from outside, the content can be in effect deleted after the expiration time. Furthermore, because it is possible to authenticate the device to which the hard disk is connected, if the device is not legitimate, data that is read is prevented from being copied illegally. In the content rental business, because content becomes irreproducible after expiry of the expiration time, the rental shop owner can keep the content as data in his custody and the rental user need not return the content.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A recording device for recording data on a recording medium, comprising:
   a read/write module which reads and writes data on a recording medium, said read/write module having electric power being supplied by an external power source;
   a battery-built-in clock which has a built-in battery and a clock function;
   an input/output interface for inputting data from outside and outputting data to outside; and
   a controller for controlling said read/write module and said input/output interface, wherein:
      said recording medium includes an ordinary data area for writing ordinary data and an expiration time data area for writing an expiration time of said ordinary data, and
      said controller performs control to alter ordinary data read from said recording medium into invalid data and output said invalid data, when said ordinary data is read and said expiration time written in said expiration time data area has passed based on a time calculated by the clock function of said battery-built-in clock, and
      said controller performs control to delete said ordinary data on said recording medium at arbitrary timing later than said expiration time.

2. A recording device according to claim 1 wherein:
   it is possible to set an expiration time mode, and
   when the expiration time mode has been set, an expiration time is written, or when an expiration time has not been set, no expiration time is written.

3. A recording device for recording data on a recording medium, comprising:
   a read/write module which reads and writes data on a recording medium, wherein said recording medium includes an ordinary data area for writing ordinary data and an expiration time data area for writing an expiration time of said ordinary data, said read/write module having electric power being supplied by an external power source;
   a battery-built-in clock which has a built-in battery and a clock function;
   an input/output interface for inputting data from outside and outputting data to outside; and
   a controller for controlling said read/write module and said input/output interface, wherein said controller performs control to:
      (1) alter valid ordinary data read from said recording medium into invalid data and output said invalid data, when said ordinary data is read at a time when the expiration time written in said expiration time data area has passed based on a time calculated by the clock function of said battery-built-in clock, and
      (2) delete the valid ordinary data from said recording medium at later timing than an expiration time.

4. A recording device according to claim 3 wherein:
   it is possible to set an expiration time mode, and
   when the expiration time mode has been set, an expiration time is written, or when an expiration time has not been set, no expiration time is written.

* * * * *